(12) United States Patent
Speidel

(10) Patent No.: US 11,664,506 B2
(45) Date of Patent: May 30, 2023

(54) CELL FOR AN ELECTROCHEMICAL SYSTEM, HAVING A FLEXIBLE ELECTRICAL CABLE FOR TAPPING OFF AN ELECTRICAL VOLTAGE

(71) Applicant: Reinz-Dichtungs-GmbH, Neu-Ulm (DE)

(72) Inventor: André Speidel, Bussmanhausen (DE)

(73) Assignee: Reinz-Dichtungs-GmbH, Neu-Ulm (DE)

(*) Notice: Subject to any disclaimer, the term of this patent is extended or adjusted under 35 U.S.C. 154(b) by 0 days.

(21) Appl. No.: 17/230,902

(22) Filed: Apr. 14, 2021

(65) Prior Publication Data

US 2021/0328232 A1   Oct. 21, 2021

(30) Foreign Application Priority Data

Apr. 15, 2020   (DE) .......................... 202020102088.9

(51) Int. Cl.
*H01M 8/04* (2016.01)
*H01M 8/0202* (2016.01)
*H01M 8/1004* (2016.01)
*H01M 8/242* (2016.01)

(52) U.S. Cl.
CPC ....... *H01M 8/0202* (2013.01); *H01M 8/1004* (2013.01); *H01M 8/242* (2013.01)

(58) Field of Classification Search
CPC ... H01M 8/0202; H01M 8/1004; H01M 8/242
See application file for complete search history.

(56) References Cited

U.S. PATENT DOCUMENTS

2007/0238005 A1* 10/2007 Yagi .................... H01M 8/0254
429/514
2011/0223508 A1* 9/2011 Arnold ................ H01M 8/0258
429/479

FOREIGN PATENT DOCUMENTS

| DE | 112010005607 B4 | 12/2014 |
| DE | 102015224126 A1 | 6/2017 |
| JP | 2008084629 A | 4/2008 |
| JP | 2012028119 A | 2/2012 |

* cited by examiner

*Primary Examiner* — Olatunji A Godo
(74) *Attorney, Agent, or Firm* — McCoy Russell LLP

(57) ABSTRACT

The present document relates to a cell for an electrochemical system, comprising two separator plates, a membrane electrode assembly (MEA) arranged between the separator plates, and at least one flexible electrical cable for tapping off an electrical voltage. The separator plates, the MEA and the cable can be compressed with one another, the flexible cable has a first end portion and a second end portion, the first end portion is arranged for fastening between the separator plates, and the second end portion protrudes laterally from the cell.

20 Claims, 9 Drawing Sheets

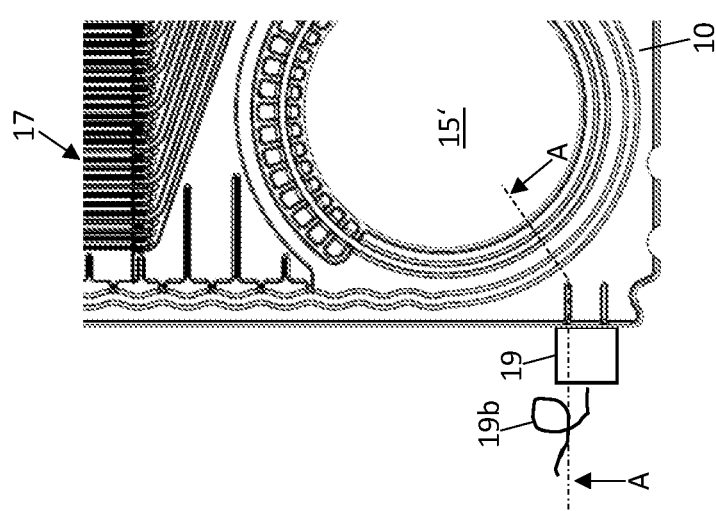
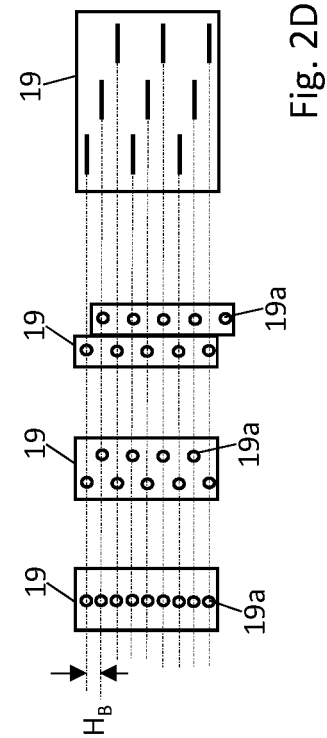
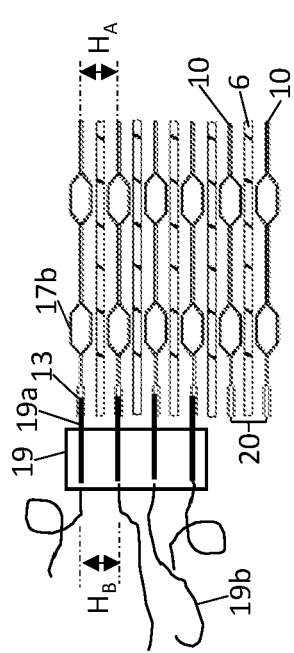

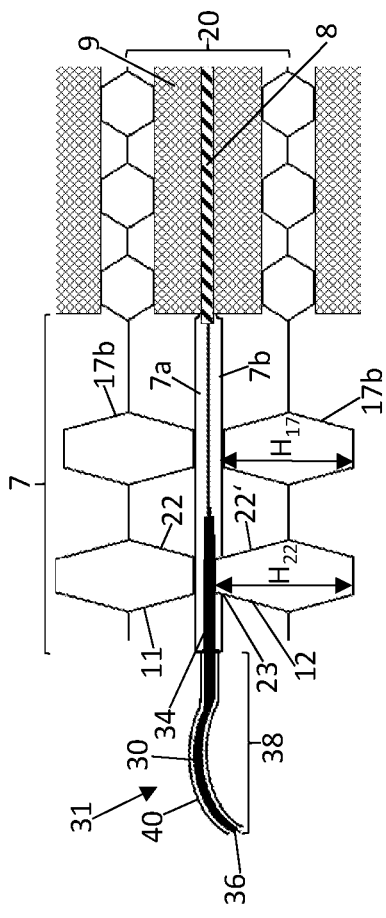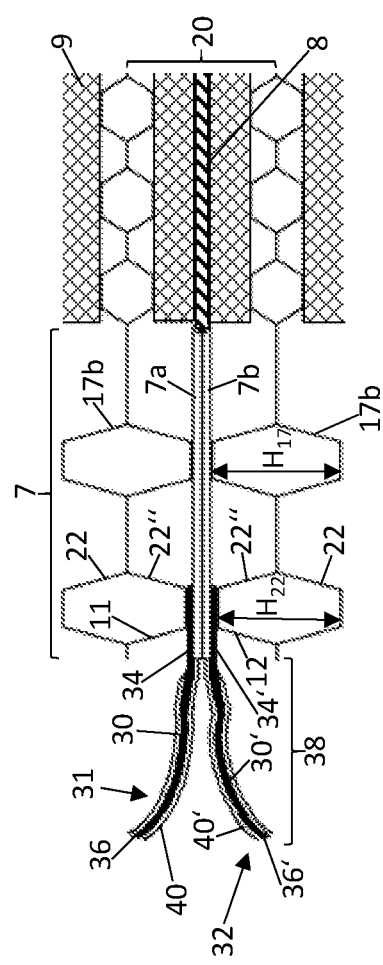

CELL FOR AN ELECTROCHEMICAL SYSTEM, HAVING A FLEXIBLE ELECTRICAL CABLE FOR TAPPING OFF AN ELECTRICAL VOLTAGE

CROSS-REFERENCE TO RELATED APPLICATION

The present application claims priority to German Utility Model Application No. 20 2020 102 088.9, entitled "CELL FOR AN ELECTROCHEMICAL SYSTEM, HAVING A FLEXIBLE ELECTRICAL CABLE FOR TAPPING OFF AN ELECTRICAL VOLTAGE," and filed on Apr. 15, 2020. The entire contents of the above-listed application are hereby incorporated by reference for all purposes.

TECHNICAL FIELD

The present disclosure relates to a cell for an electrochemical system, which has a flexible cable for tapping off an electrical voltage. The present disclosure additionally relates to an electrochemical system comprising a plurality of stacked cells.

BACKGROUND AND SUMMARY

Bipolar plates for an electrochemical system usually comprise a plate pair comprising two individual metal plates, wherein in each case two bipolar plates surround an electrochemical cell, that is to say for example a fuel cell. The individual plates are sometimes also called separator plates. In the narrower sense, one individual plate belongs to one cell and the other individual plate of the bipolar plates already belongs to the next cell. In an electrochemical system, usually a plurality of electrochemical cells, for example up to 400, are stacked in series to form a stack. In addition to two half bipolar plates, the cells themselves usually comprise a membrane electrode assembly, also referred to as an MEA, which is arranged between the bipolar plates, as well as a gas diffusion layer (GDL), made for example of electrically conductive carbon fleece, on both sides of the MEA. The MEA typically also includes a frame element, which covers the edge of the actual membrane on both surfaces thereof and has an insulating effect in this edge region. The entire stack is held together between two end plates by way of a clamping system and is provided with a predetermined compression.

Besides surrounding the electrochemical cells, the bipolar plates or separator plates have a number of other functions in an electrochemical system, namely on the one hand indirectly electrically contacting the electrodes of the various electrochemical cells and transmitting the current to the respective adjacent cell, and on the other hand supplying reaction media to the cells and removing the reaction products, and also cooling the electrochemical cells and transferring the waste heat, as well as sealing off the compartments of the two different reaction media and the coolant with respect to one another and with respect to the outside.

Through-openings for reaction media, that is to say usually on the one hand hydrogen or methanol and on the other hand air or oxygen, as well as coolants, usually mixtures of demineralized water and antifreeze, are accordingly formed in the two metal individual plates of the bipolar plates in order to supply the electrochemical cells. A distributing structure is also formed in each of the two metal separator plates, with channels being formed on both surfaces of the two separator plates. A respective reaction medium is guided on each of the outward-facing surfaces of the bipolar plate, and the coolant is guided in the intermediate space between the two metal individual plates. The region that, in an orthogonal projection in a common plane with the MEA, coincides with the actual membrane and not with the frame-like edge region thereof, which is often configured as an edge reinforcement, or the sealing structure thereof, is also referred to as the electrochemically active region of the bipolar plate. In this electrochemically active region of the bipolar plate, a reaction medium is guided in a channel structure on the surface of the bipolar plate facing towards the MEA. The electrochemically active region is usually adjoined on two sides by a distribution region that likewise has channel-type distributing structures. Each of the distributing structures communicates with at least two of the through-openings, namely at least one inlet and at least one outlet for the respective fluid. For sealing with respect to the outside, a respective sealing structure is arranged in each of the metal separator plates (individual plates), at least extending in a closed manner around the electrochemically active region of the bipolar plate and optionally around at least some of the through-openings, said sealing structure being spaced apart from the electrochemically active region or the rim of the through-opening in question. In addition, in order to seal them off with respect to one another, individual through-openings may also be sealed off by an intrinsically closed sealing structure extending around the respective through-opening.

To check whether the electrochemical cells are delivering a sufficient cell voltage (individual cell voltage measurement, CVM), the individual cells are electrically contacted at the edge of the respective bipolar plates. By virtue of the contacting, the voltage of the electrochemical cells can be monitored during operation, so as also to avoid pole reversal and thus damage to the cell.

This contacting must be mechanically stable and vibration-resistant in order to be able to check the cell voltage even during operation, for example when used in a vehicle. To measure the voltage of a bipolar plate, a pin has for example hitherto been clamped between the individual plates of a bipolar plate. Typically, a plurality of pins are combined to form a connector. The pins of the connector are then pushed jointly into the assembled stack. Each pin electrically contacts just one bipolar plate, and no short-circuit with adjacent voltage taps occurs.

Using pins to tap the CMV poses a risk of a short-circuit since all the bipolar plates must be contacted within a very tight space. Several hundred amps are produced in the event of a short-circuit. If a short-circuit occurs, this usually takes place directly on the cell unit. Due to its thermal influence, the short-circuit leads to the destruction of the electrically insulating MEA in the edge region and also of the neighbouring cells. After such a short-circuit, the stack is usually partially destroyed and can no longer be used.

Each separator plate can define a plate plane. A cell spacing can be defined by a perpendicular spacing between the plate planes of two separator plates forming the cell. Should the cell spacing change as a result of set-up variations, for example due to changing the MEA or changing the compression in the stack, the connector may in some cases no longer fit the stack since the pins in the connector are typically at a defined spacing from one another. The cell spacing may also change due to installation and manufacturing tolerances or temperature fluctuations. As a result of a change in the cell spacing, the connector and/or the pins connected to the cells may deform or may become detached from the cells. If the deformation of the connector or of the pins becomes too great, the components may be damaged. At worst, this may lead to the above-described short-circuit and to destruction of the stack.

Connectors from the prior art are usually configured only for one type of stack and/or for one cell spacing. It may happen, therefore, that the cell spacing of a particular stack does not correspond to the design of the connector. It would be desirable if one and the same connector could be used for multiple types of stack.

The object of the present disclosure is therefore to solve at least one or more of the aforementioned problems.

According to the present disclosure, a cell for an electrochemical system is provided. The cell comprises two separator plates, a membrane electrode assembly (MEA) arranged between the separator plates, and at least one flexible electrical cable for tapping off an electrical voltage. The separator plates, the MEA and the cable can be compressed with one another. The flexible cable has a first end portion and a second end portion, wherein the first end portion is arranged for fastening between the separator plates, wherein the second end portion protrudes laterally from the cell.

Since the flexible cable can be or is compressed with the separator plates, a mechanically stable and vibration-resistant connection can be provided. The second end portion of the cable protrudes beyond an outer edge of the separator plates. Since the cable protrudes laterally and is flexible, the above-described variations in cell spacing can also be compensated without the cable being destroyed or a short-circuit occurring. The voltage tap of the cell according to the present disclosure can therefore be used universally and does not require a spacing dependent on the system.

In one variant, at least one of the two separator plates has an elevation, facing towards the other separator plate, for fastening the cable. The first end portion of the cable may be arranged between the elevation and the opposite separator plate. The elevation may be configured to electrically contact the cable. By providing said elevation, the cable can be fastened between the separator plates in a positionally secure manner and with reliable contact being established. The at least one elevation may be configured as an embossed structure, such as a frustoconical embossment. Such an embossment may also be referred to as an embossed dome. The elevation may be integrally formed in the respective separator plate by deep-drawing or embossing.

It may be provided that each of the two separator plates has an elevation of this type. Typically, the two elevations face one another and/or are arranged opposite one another in the direction of compression. The two elevations may have an identical shape or may each have a different shape. The cable is usually arranged between the elevations, in one embodiment together with the MEA, in another embodiment together with the insulating edge of the MEA. Usually only one of the two elevations is in electrical contact with the cable. The respective other elevation and the cable are usually electrically insulated from one another. Possible electrical insulations will be discussed below.

At least one of the separator plates usually has at least one peripheral, intrinsically closed sealing element that encloses a region of the separator plate and seals off this region with respect to the surrounding environment and/or within the cell. The separator plates often have a flow field for a medium and/or at least one through-opening for the passage of a medium, the at least one sealing element extending around the flow field and/or the through-opening. The at least one sealing element may be embossed into the separator plate and may be configured for example as a sealing bead.

The elevation may be arranged outside of the region of the separator plate that is enclosed by the sealing element. The elevation is usually spaced apart from the peripheral sealing element. Since the elevation is usually provided only for fastening the cable and/or electrically contacting the cable, usually no sealing function or flow-guiding function is associated with this type of elevation. The elevation is typically provided in an outer edge region of the separator plate. One of the advantages of the application occurs when the elevation is located in a region that is not formed as a projection of the outer edge, but rather in a region that is surrounded by plate material in all directions in the plate plane. An even and continuous compression of the elevation is enabled if the region in which the elevation is formed is surrounded by plate material in all directions in the plate plane over a length corresponding to at least 66% of the diameter, at least 80% of the diameter, or at least the value of the diameter of the elevation.

The height ratios between the elevation and the sealing element vary from embodiment to embodiment. However, the height of the elevation may be at least 40% of the height of the sealing element with reference to a bipolar plate, that is to say two individual plates.

In addition or as an alternative, the cable may be adhesively bonded to the MEA and/or to one of the separator plates, wherein electrical contact may be established at the adhesive bonding site or in the immediate vicinity thereof. Adhesive bonding can make it easier to assemble the components to form the cell. One of the advantages of the application occurs if, even though the cable is connected to the MEA in a materially bonded manner, thereby enabling pre-assembly of these elements, the connection between the separator plate and the cable takes place by way of a force fit via the compression of the stack, that is to say in a reversible manner. In this way, the separator plates can easily be removed when disassembling a stack. The flexible cable can thus be fastened between and/or to the separator plates in such a way as to be able to be detached and removed without being destroyed, such as by way of a force fit and/or form fit, usually only by way of a force fit and/or form fit.

The MEA may have at least one frame-like reinforcing layer. The MEA usually has an electrochemically active region as well as an edge region terminating the latter at its outer edge, wherein the edge region may be formed by the at least one frame-like reinforcing layer, also referred to as edge reinforcement. In the context of this document, the frame-like reinforcing layer is to be understood as part of the MEA. In certain embodiments, therefore, the edge region of the MEA or the edge reinforcement of the MEA will be considered in the outer edge region of the electrochemical cell that is considered in connection with the voltage measurement. The edge region of the MEA and the outer edge region of the separator plates may overlap and touch one another at least in part. The frame-like reinforcing layer may be made of an electrically insulating material. In one embodiment, the first end portion of the cable adjoins the frame-like reinforcing layer. In some variants, the MEA comprises two frame-like reinforcing layers. The first end portion of the cable may be arranged between the reinforcing layers of the MEA. In some embodiments, one of the reinforcing layers may have a cutout, in which the elevation of the separator plate engages. The first end portion may thus electrically contact the elevation in the region of the cutout.

In other embodiments, the first end portion is not arranged between the reinforcing layers.

The MEA typically comprises a membrane, for example an electrolyte membrane, which usually forms the electrochemically active region. The membrane may be connected to the frame-like reinforcing layer. By way of example, the frame-like reinforcing layer may be connected to the membrane in a materially bonded manner, for example by way of an adhesive bond or by lamination. If two frame-like reinforcing layers are provided, an outer edge of the membrane is typically arranged between the two reinforcing layers.

In some embodiments, the cable has in some regions an electrically insulating layer, for example made of plastic. The electrically insulating layer may extend in the longitudinal direction of the cable and may sheath the actual conductor of the cable. The electrically insulating layer may therefore be configured as a sheath. In some embodiments, the part of the cable that protrudes laterally from the cell is provided with the electrically insulating layer at least in some regions. In some embodiments, the second end portion may be spaced apart from the separator plates by an insulated cable portion. However, the part of the cable that does not protrude beyond the rest of the outer edge of the cell and/or that is arranged between the separator plates and/or that is arranged between the frame-like reinforcing layers may have, but need not necessarily have, an electrically insulating layer. The electrical insulation of this part of the cable may be provided by the MEA, such as the at least one frame-like reinforcing layer.

The flexible cable is typically in electrical contact with just one of the two separator plates. In some embodiments, the cell comprises two flexible electrical cables of the type described above. In this case, each cable is in electrical contact with a single separator plate. The cables may be referred to as the first cable and the second cable. Furthermore, the separator plates may be referred to as the first separator plate and the second separator plate. In some embodiments, the first cable may be in electrical contact with the first separator plate, while the second cable electrically may contact the second separator plate. The cables may be spaced apart and electrically insulated from one another. The MEA, which in the relevant area may be the at least one reinforcing layer, may be arranged between the first end portions of the cables. The MEA may provide the electrical insulation of the two cables.

The flexible electrical cable may exist as a separate component and thus may not be part of the separator plates and/or the MEA. However, the cable may in some cases be part of the MEA, and/or parts of the cable, such as its insulation or portions thereof, may be formed from parts of the MEA. For example, it may be provided that the MEA, such as the at least one reinforcing layer, has a projection that protrudes laterally from the cell. The projection may protrude beyond an outer edge of the separator plates. The projection may form part of the flexible cable, such as the insulating part of the cable. The electrically conductive part, that is to say the actual conductor, of the flexible cable may then in part be arranged on the projection and/or embedded in the projection and/or connected to the projection, for example by way of a form fit and/or in a materially bonded manner. By way of example, the flexible cable comprises a conductor track printed onto the projection. The projection may be made of a flexible and electrically insulating material. In these embodiments, fewer individual parts have to be put together when assembling the cell.

The cable on the one hand and the separator plates on the other hand are usually made of different materials. In certain embodiments, the actual conductor of the cable may be made of copper or a copper alloy, aluminium or an aluminium alloy. Composite materials are also possible, such as conductive polymers, for example polymers containing embedded conductive particles, such as graphite. The electrically conductive part, that is to say the conductor of the cable, may also be injected onto the reinforcing layer of the MEA as a plastic element containing such embedded conductive particles. The separator plates may be formed of metal materials or metal alloys. These are above all steel, stainless steel, titanium, or combinations of nickel, chromium or other transition metals. The conductor of the cable may alternatively also be made of the same material as the material of the separator plates.

By compressing the components, the first end portion can be connected to the cell by way of a force fit. Furthermore, it may be provided that the separator plates, the MEA and the cable can be elastically compressed with one another. The cable may be formed entirely, or at least in the region of the first end portion, as a strip-shaped flat cable.

The second end portion may form a free end of the cable. The second end portion of the cable is usually configured for direct or indirect connection to a voltage measuring device for measuring an electrical cell voltage.

The cell may be bounded by the separator plates. Each separator plate may be part of a bipolar plate, the bipolar plate typically comprising two separator plates that are connected to one another. The cell may therefore be bounded by two bipolar plates. As indicated above, in an arrangement of stacked cells, one separator plate of the bipolar plate belongs to one cell and the other separator plate of the bipolar plate belongs to the next, adjacent cell.

The cell may be used for example for a fuel cell system, in which electrical energy is obtained from hydrogen and oxygen. The cell may also be used for an electrolyzer, in which hydrogen and oxygen are produced from water by applying a potential. The cell may likewise be used for an electrochemical compressor, in which molecular hydrogen is transported through a membrane by means of oxidation/reduction by applying a potential and at the same time is compressed.

The present disclosure also provides an electrochemical system. The electrochemical system comprises a plurality of stacked cells of the type described above. The electrochemical system according to the present disclosure may comprise one of the aforementioned electrochemical systems.

The second end portions of the flexible cables may be mechanically and electrically connected to an interface. The interface may be a connection point where the second end portions are connected to a voltage measuring device.

The electrochemical system may also comprise a voltage measuring device for measuring a cell voltage of the respective cells. In this case, the cables of the cells are directly or indirectly electrically connected to the voltage measuring device, in one embodiment by the respective second end portions.

By way of example, the second end portions of the flexible cables may be mechanically and electrically connected to the interface mentioned above. The interface may be mechanically and electrically connected to the voltage measuring device. The interface may be formed on the voltage measuring device, for example as a male connector or female connector.

A cell according to the present disclosure and an electrochemical system according to the present disclosure will be described in greater detail below with reference to figures. Further detail will be provided in the context of examples, it also being possible for some of these elements per se to be used to develop the present disclosure further, including outside of the context of the respective example and other features of the respective example. Furthermore, in the figures, identical or similar reference signs will be used for identical or similar elements, and the explanation thereof will therefore sometimes be omitted.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE FIGURES

FIG. 2B shows a detail view of the separator plate of FIG. 2A with a connector inserted;

FIG. 2C shows a sectional illustration through an electrochemical system along a section line A-A shown in FIG. 2B;

FIG. 2D shows various side views of connectors according to the prior art;

FIG. 7 shows a sectional illustration through an edge region of an electrochemical cell according to one embodiment of the present disclosure;

FIG. 8 shows a sectional illustration through an edge region of an electrochemical cell according to one embodiment of the present disclosure;

FIGS. 1-12 are shown approximately to scale.

DETAILED DESCRIPTION

Figure 1:
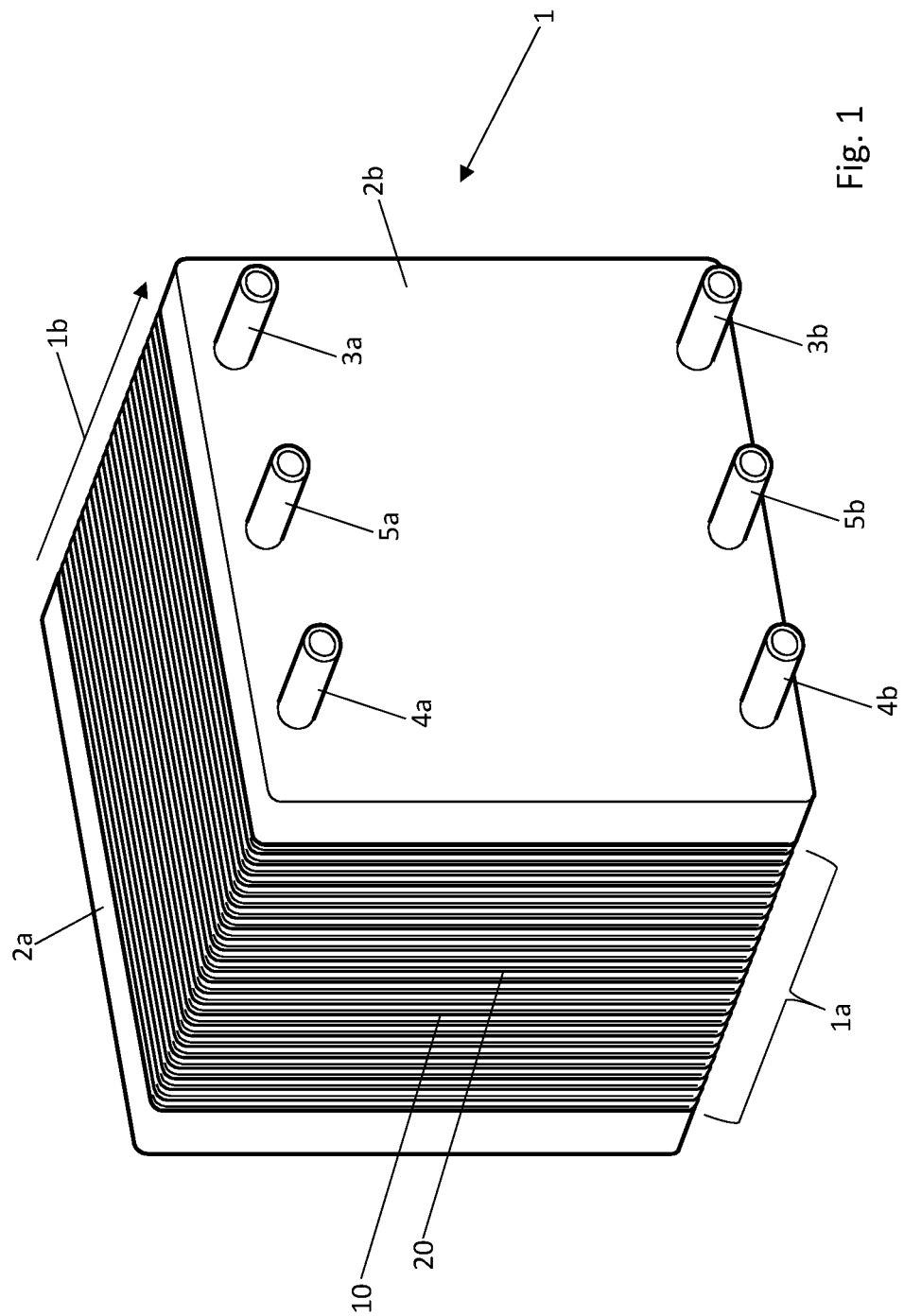
FIG. 1 shows an electrochemical system according to the prior art in a perspective view.

FIG. 1 shows an electrochemical system 1 of the type proposed here, comprising a plurality of identical metal bipolar plates 10 that are arranged in a stack 1a and are stacked along a stacking direction 1b extending perpendicular to a plate plane of the bipolar plates 10. The bipolar plates 10 of the stack 1a are clamped between two end plates 2a, 2b. Each of the bipolar plates 10 comprises a first 11 and a second 12 metal separator plate (see for example FIG. 2C), which are connected to one another for example in a materially bonded manner. A plane, in which a flat, non-deformed part of the first plate 11 touches a flat, non-deformed part of the second plate 12 when forming a bipolar plate 10, will hereinafter be referred to as the plate plane of the bipolar plate 10. In the present example, the system 1 is a fuel cell stack. Each two adjacent bipolar plates 10 of the stack bound an electrochemical cell 20, which serves for example to convert chemical energy into electrical energy. In each case one individual plate 11, 12 of the bipolar plate 20 forms part of another cell 20. In other words, in the narrower sense, the separator plate 11 belongs to one cell 20 and the other separator plate 12 of the bipolar plate 10 already belongs to the next cell 20. In the system, usually a plurality of electrochemical cells 20, for example up to 400, are stacked in series to form a stack.

The electrochemical cells 20 usually each comprise a membrane electrode assembly (MEA) 6, which in its outer region has an electrochemically inactive frame 7 that is formed by two frame-like reinforcing layers 7a, 7b. The MEA 6 typically contains at least one membrane 8, for example an electrolyte membrane, which forms an electrochemically active region. Furthermore, a gas diffusion layer 9 (GDL) may be arranged on one or both surfaces of the MEA (see FIGS. 5-9).

In alternative embodiments, the system 1 can likewise be designed as an electrolyzer, compressor, or as a redox flow battery. Bipolar plates can likewise be used in these electrochemical systems. The structure of these bipolar plates may then correspond to the structure of the bipolar plates 10 explained in detail here, although the media guided on and/or through the bipolar plates in the case of an electrolyzer, an electrochemical compressor or a redox flow battery may differ in each case from the media used for a fuel cell system.

The end plates 2a, 2b have a plurality of media ports 3a, 3b, 4a, 4b, 5a, 5b, via which media can be fed to the system 1 and via which media can be discharged from the system 1. Said media, which can be fed to the system 1 and discharged from the system 1, may comprise for example fuels such as molecular hydrogen or methanol, reaction gases such as air or oxygen, reaction products such as water vapor or depleted fuels, or coolants such as water and/or glycol.

Figure 2A:
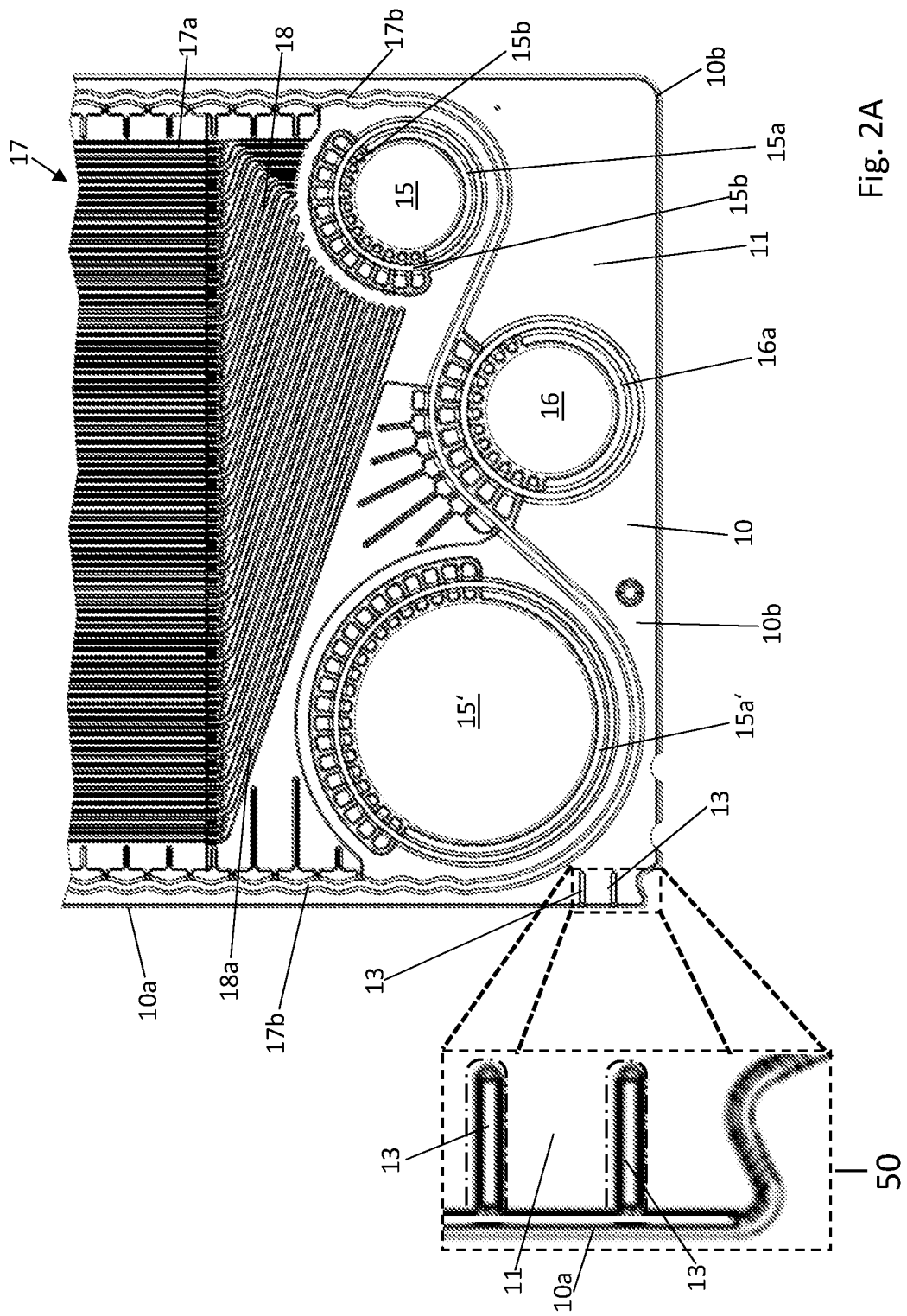
FIG. 2A shows part of a separator plate and a detail view of sockets for connector pins according to the prior art in a plan view.

FIG. 2A shows, in a plan view, part of a bipolar plate 10 known from the prior art, the bipolar plate 10 shown in FIG. 2A being usable for example in an electrochemical system of the same type as the system 1 from FIG. 1. The bipolar plate 10 has a first and a second separator plate 11, 12, which are connected to one another in a materially bonded manner along the plate plane of the bipolar plate 10. Only the first separator plate 11 is visible in FIG. 2A; the second separator plate 12 is hidden by the first separator plate 11. The first and second separator plate 11, 12 may each be manufactured from a metal sheet, for example from a stainless steel sheet. The separator plates 11, 12 have through-openings, which are aligned with one another and form the through-openings 15, 15' and 16 of the bipolar plate 10. When a plurality of bipolar plates of the same type as the bipolar plate 10 are stacked, the through-openings 15, 15' and 16 form lines that extend through the stack 1a in the stacking direction 1b (see FIG. 1). Typically, each of the lines formed by the through-openings 15, 15', 16 is fluidically connected to one of the media ports 3a, 3b, 4a, 4b, 5a, 5b in the end plates 2a, 2b of the system 1. By way of example, the lines formed by the through openings 15, 15' serve to supply fuel and reaction gas to the electrochemical cells of the fuel cell stack 1a. In contrast, coolant can be introduced into the stack 1a or discharged from the stack 1a via the line formed by the through-opening 16.

In order to seal off the through-openings 15, 15', 16 with respect to the interior of the stack 1a and with respect to the surrounding environment, the first separator plate 11 has beads 15a, 15a', 16a, which are each arranged around the through-openings 15, 15', 16 and in each case fully surround the through-openings 15, 15', 16. On the rear side of the bipolar plate 10, facing away from the viewer of FIG. 2A, the second separator plate 12 has corresponding beads for sealing off the through-openings 15, 15', 16 (not shown).

In an electrochemically active region 17 of the bipolar plate 10, the first separator plate 11 has, on the front side thereof facing towards the viewer of FIG. 2A, a flow field 17 with guide structures 17a for guiding a reaction medium along the front side of the bipolar plate 10. In FIG. 2A, these guide structures 17a are defined by a plurality of webs and channels extending between the webs and delimited by the webs. Only part of the active region 17 on the front side of the bipolar plate 10 is shown in FIG. 2A. On the front side of the bipolar plate 10 facing towards the viewer of FIG. 2A, the first separator plate 11 additionally has a distribution or collection region 18. The distribution or collection region 18 comprises distributing structures 18a, which are configured to distribute over the active region 17 a medium that is introduced into the distribution or collection region 18 from the through-opening 15, or to collect or to pool a medium flowing towards the through-opening 15 from the active region 18. In FIG. 2A, the distributing structures 18a of the distribution or collection region 18 are likewise defined by webs and channels extending between the webs and delimited by the webs.

The first separator plate 11 additionally has a perimeter bead 17b, which extends around the active region 17, the distribution or collection region 18 and the through-openings 15, 15' and seals these off with respect to the environment surrounding the system 1. In the present example, the active region 17, the distribution or collection region 18 and the through-openings 15, 15' are sealed off by the perimeter bead 17b also with respect to the through-opening 16, that is to say with respect to the coolant circuit. However, it would likewise be possible for the through-opening 16 to be arranged inside the region enclosed by the perimeter bead. A perimeter bead is therefore a sealing element in exactly the same way as a bead referred to here as a sealing bead. The structures of the active region 17, the distributing structures of the distribution or collection region 18 and the beads 15a, 15a', 16a and 17b are formed in one piece with the first plate 11 and are integrally formed in the first separator plate 11, for example in an embossing or deep-drawing process.

The distributing structures 18a of the distribution or collection region 18 of the first separator plate 11 are fluidically connected, via passages 15b through the bead 15a, to the through-opening 15 or to the line through the stack 1a that is formed by the through-opening 15. For the sake of clarity, only some of the passages 15b through the bead 15a are designated by reference signs in FIG. 2A. Likewise, the distributing structures 18a of the distribution or collection region 18 are fluidically connected to the structures and/or channels of the active region 17. A medium that is guided through the through-opening 15 can thus be introduced, via the passages 15b in the bead 15a and via the distributing structures 18a of the distribution or collection region 18, into the active region 17 of the first separator plate 11.

The through-opening 15' or the line through the stack 1a that is formed by the through-opening 15' is correspondingly fluidically connected to a distribution or collection region, and via the latter to a flow field of an active region on the rear side of the bipolar plate 10 facing away from the viewer of FIG. 2A. In contrast, the through-opening 16 or the line through the stack 1a that is formed by the through-opening 16 is fluidically connected to a cavity that is enclosed or surrounded by the first and second separator plate 11, 12, which cavity is configured to guide a coolant through the bipolar plate 10.

The first and second separator plates 11, 12 of the bipolar plate 10 of FIG. 2A, which are arranged approximately congruently one above the other, are approximately rectangular in shape and have rounded corners. In one of the corners, here adjacent to the first through-opening 15', two sockets 13 for connector pins 19a are arranged next to one another (see detail views in FIGS. 2A, 2B). The sockets 13 are each formed by an elongated recess in the first separator plate 11 and the second separator plate 12, said recesses extending along the plate plane in parallel, one above the other, from an outer edge 10a to an interior of the bipolar plate 10. A longitudinal direction of the recesses, and thus also a longitudinal direction of the sockets 13, extends at an angle of 90° to the outer edge 10a. The recesses of the first and second separator plate 11, 12 furthermore protrude out of the plate plane of the bipolar plate 10 on opposite sides, so that the recess of the first separator plate 11 and the recess of the second separator plate 12 together form an elongated socket 13 for a connector pin 19a. A rigid, pin-shaped connector 19a (connector pin) can be plugged into such a socket 13.

FIG. 2B shows a detail view of FIG. 2A, wherein at least one connector pin 19a is plugged into the sockets 13 provided for this purpose. FIG. 2C shows a sectional illustration through an electrochemical system 1 along a section line A-A shown in FIG. 2B. As can be seen from FIG. 2C, the connector pins 19a are constituent parts of a connector 19, which is connected via connector cables 19b to a voltage measuring device (not shown). By means of the voltage measuring device, the voltage of the respective cells 20 can be monitored during operation of the electrochemical system 1.

FIG. 2C additionally shows a cell spacing HA, which describes the perpendicular spacing between the plate planes of two adjacent bipolar plates 10. A pin spacing HB between adjacent connector pins 19a perpendicular to the plate plane is also shown. Since the connector pins 19a extend substantially parallel to the plate planes, the pin spacing HB of adjacent connector pins 19a is constant. The connector pins 19a are thus spaced apart in the vertical direction by the pin spacing HB in a housing of the connector 19. In one embodiment, in order for the connector 19 to fit the stack 1a, the pin spacing HB must be exactly the same as the cell spacing HA. The connector 19 can thus usually be used for a particular electrochemical system 1.

FIG. 2D shows side views of different connectors 19. To increase a spacing in a direction perpendicular to the plate plane, some connector pins 19a are plugged into a socket 13 of a separator plate 10 in a manner offset from one another. Although the spacing between adjacent connector pins 19a can thereby be increased, the pin spacing HB perpendicular to the plate plane is the same in all the variants shown in FIG. 2D, namely equal to the cell spacing HA.

If there are variations in the cell spacing HA, for example due to variation in the compression in the system 1 and/or due to variation in a material used for the MEA 6, the connector 19 may in some cases no longer fit. Due to thermal expansion of the cells 20, the cell spacing HA may change even during operation of the electrochemical system 1. On account of the changed cell spacing HA, the connector 19 and the connector pins 19a may deform. In the worst case, a single deformed connector pin 19a may contact a plurality of separator plates 10 at the same time, which may lead to a short-circuit and may cause damage to the electrochemical system 1.

The present disclosure has been designed to overcome the problems of the prior art at least in part.

Figure 3:
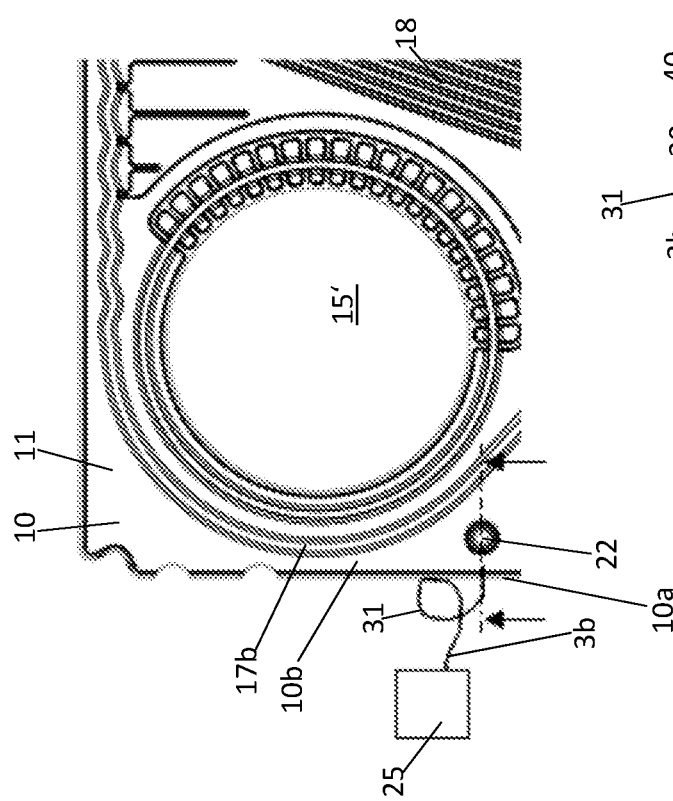
FIG. 3 shows a detail view of a bipolar plate of an electrochemical cell according to one embodiment of the present disclosure.
Figure 4:
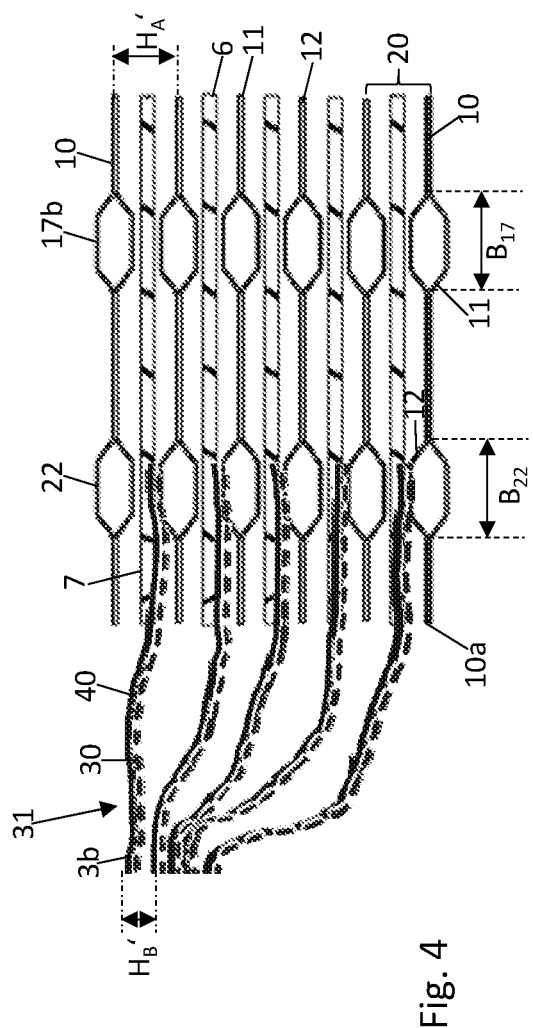
FIG. 4 shows a sectional illustration through an electrochemical system along a section line B-B shown in FIG. 3.

FIG. 3 shows a detail view of a bipolar plate 10 or a separator plate 11 of an electrochemical cell 20 according to one embodiment of the present disclosure, in a plan view. FIG. 4 shows a sectional illustration along a section line B-B shown in FIG. 3.

As an alternative to the rigid connector pins 19a and the sockets 13, according to the present disclosure a flexible electrical cable 31 having an electrical conductor 30 is provided. Except for the connector pins 19a and the sockets 13, the separator plate 11 (or the bipolar plate 10) may have at least some or all of the features of the separator plate 11 described above.

The flexible cable 31 is provided for tapping off an electrical voltage of the cell 20. To this end, the cable 31 is in electrical contact with one of the separator plates 11, 12. The flexible cable 31 has a first end portion 34 and a second end portion 36. The first end portion 34 and the second end portion may be connected to one another by a middle cable portion. The first end portion 34 of the cable is arranged for fastening the cable 31 between the separator plates 11, 12. In one embodiment, the separator plates 11, 12, the MEA 6 and the first end portion 34 of the flexible cable 31 are elastically compressed with one another. For even compression, at least the first end portion 34 of the cable 31 may be configured as a strip-shaped flat cable. The cable 31 is thus connected to the cell 20 by way of a force fit, sometimes also by way of a form fit. The second end portion 36 protrudes laterally from the cell 20 and is connected directly or indirectly, for example via an interface 25, to a voltage measuring device. The second end portion 36 and, if provided, the middle cable portion protrude beyond an outer edge 10a of the separator plates 11, 12. For electrical insulation, the cable 31 may have an insulating layer 40, which at least partially surrounds the actual conductor 30 (FIG. 4), or a cable portion 38 that is insulated all the way round (FIGS. 5, 6, 7, 8). The second end portion 36 may be spaced apart from the separator plates 11, 12 via the insulated cable portion 38 or the middle cable portion (see for example FIGS. 5-8). In some embodiments, the insulated cable portion 38 and the middle cable portion are formed by the same element.

As already explained in connection with FIG. 1, typically a plurality of cells 20 are arranged in parallel in the stack 1a. A flexible cable 31 is provided for each cell 20. The second end portions 36 of the cables 31 may be brought together and connected both mechanically and electrically to an interface 25 (see FIGS. 11A-11E). The interface 25 may in turn be connected to a voltage measuring device. In FIGS. 11A-11E, this interface 25 is configured as a female connector, but it may alternatively be configured as a male connector. Due to the flexibility of the cables 31, a cable spacing HB' between the second end portions 36 in a housing of the interface 25 can be selected independently of the cell spacing HA' (see for example FIG. 4). The interface 25 and the cables 31 can thus be used in different cell types and/or stack types and/or electrochemical systems 1. In addition, the flexible cables 31 permit variations in the cell spacing HA', so that the risk of a short-circuit or of damage to the cell can be considerably reduced.

In order to fasten the first end portion 34, at least one of the separator plates 11, 12 may have an elevation 22 facing towards the respective other separator plate 12, 11 of the cell 20. The end portion 34 is arranged between the elevation 22 and the opposite separator plate 11, 12. In the embodiments of FIGS. 4-9, both separator plates 11, 12 have such an elevation 22, wherein the two elevations 22 of the separator plates 11, 12 face towards one another and the end portion 34 is arranged between the elevations 22. Orthogonal projections perpendicular to the plate plane of the elevations 22 overlap one another.

The elevations 22 are integrally formed in the respective separator plates 11, 12 as embossed structures, for example in a deep-drawing or embossing process. In certain embodiments, the elevations 22 may each be configured as a frustoconical embossment (embossed dome). While the mutually facing elevations 22 of the separator plates 11, 12 in FIGS. 4-6 have an identical shape, it may alternatively be provided that mutually facing elevations have different shapes.

One example of this is given in FIG. 7, where the elevation 22' of the separator plate 12 has a larger size in the direction perpendicular to the plate plane than the elevation 22 of the separator plate 11. This higher elevation 22' engages through a cutout 23 in the frame-like reinforcing layer 7b and thus contacts the conductor 30 of the cable 31 or the first end portion 34 thereof.

Figure 9:
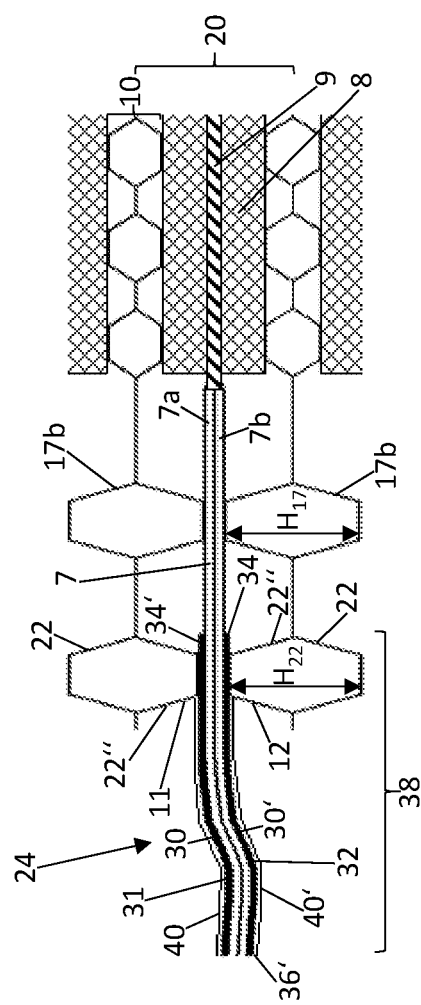
FIG. 9 shows a sectional illustration through an edge region of an electrochemical cell according to one embodiment of the present disclosure.

Other embodiments of this are given in FIGS. 8 and 9, where cables 31, 32 are applied in each case between every second bipolar plate 10, namely in each case on both sides of the frame 7. The end portions 34, 34' therefore come to lie between every second separator plate 11 or 12 and the frame 7, so that the elevations 22" on this side of the bipolar plate 10 each have a smaller height than the elevations 22 on the respective other side of the respective bipolar plate 10.

Figure 5:
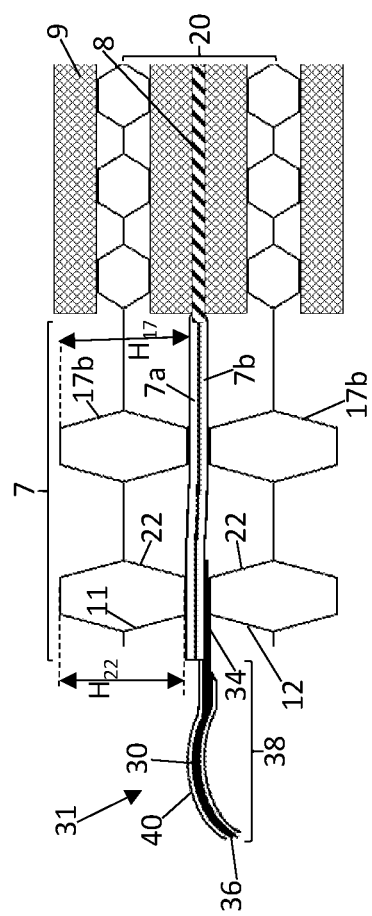
FIG. 5 shows a sectional illustration through an edge region of an electrochemical cell according to one embodiment of the present disclosure.

Since the frame-like reinforcing layers 7a, 7b are usually not rigid, but instead have a certain flexibility, it is possible, even when the first end portion 34 of the cable 31 is applied on just one side, to configure the separator plates 11, 12 with elevations 22 of equal height, as shown in FIG. 5. Here, the height is compensated by a slight bending of the frame 7. In the case of such height compensation, the height ratios refer to the sum of the heights of the elevations located one above the other or to the sum of the heights of the sealing elements located one above the other in the two separator plates of a bipolar plate.

The elevation 22 may be arranged outside of a region enclosed by the perimeter bead 17b and outside of a region enclosed by the sealing bead 16a. By way of example, the elevation 22 is provided in an outer edge region 10b of the separator plate 11, 12. A height of the elevation 22, measured perpendicular to the plate plane, may differ from a height of the perimeter bead 17b and may for example be smaller than the height of the perimeter bead 17b. On the other hand, the height of the elevation 22 is at least 40% of the height of the sealing bead so as to ensure sufficient compression. A thickness of the first end portion 34, measured perpendicular to the plate plane, may correspond to the difference in height of the elevation 22 and of the perimeter bead 17b; in FIG. 5, for instance, this applies to the difference between the sum of the height of the elevations 22 of the two separator plates 11, 12 and the sum of the height of the perimeter beads 17b of the two separator plates 11, 12.

In FIG. 3, the elevation 22 is located in a region of the outer edge region 10b that is not formed as a projection of the outer edge 10a, but instead in a region that is surrounded by plate material in all directions in the plate plane. This ensures an even and continuous compression of the elevation in the assembled cell stack. In the example of FIG. 3, the region in which the elevation 22 is formed is surrounded by plate material in all directions in the plate plane over a length that corresponds at least to the value of the diameter of the elevation 22; this is also clear from the sectional illustration of FIG. 4. The outer edge 10a extends in a substantially rectilinear manner adjacent to the region in which the elevation 22 is formed, over a length of at least 5 times, 10 times, or 20 times the size of the elevation in this direction. The rectilinearly extending outer edge 10a thus has no indentations or projections in the region of the connection point of the flexible cable and in the aforementioned adjacent region. The width or the diameter $B_{22}$ of the elevation is similar to the width $B_{17}$ of the sealing element 17b, such as the width thereof perpendicular to the direction of extension thereof. The width or the diameter $B_{22}$ of the elevation may be between 25% and 400%, between 33% and 300%, or between 50% and 200% of the width $B_{17}$ of the sealing element 17b.

The conductor 30 on the one hand and the separator plates 11, 12 on the other hand are usually made of different materials. In certain embodiments, the conductor 30 may be made of copper or a copper alloy, aluminium or an aluminium alloy.

As indicated above, the MEA 6 may have two frame-like reinforcing layers 7a, 7b and a membrane 8, wherein the reinforcing layers 7a, 7b and the membrane 8 may be connected to one another by adhesive bonding or lamination. Here, the reinforcing layer 7a faces towards the first separator plate 11, while the reinforcing layer 7b faces towards the second separator plate 12.

The first end portion 34 may directly adjoin the MEA 6, such as adjoining at least one of the frame-like reinforcing layers 7a, 7b. For instance, FIG. 5 shows that the first end portion 34 of the cable 31 contacts the reinforcing layer 7b on one side and the separator plate 12 on the other side. The first end portion 34 is thus arranged between the reinforcing layer 7b and the separator plate 12.

Figure 6:
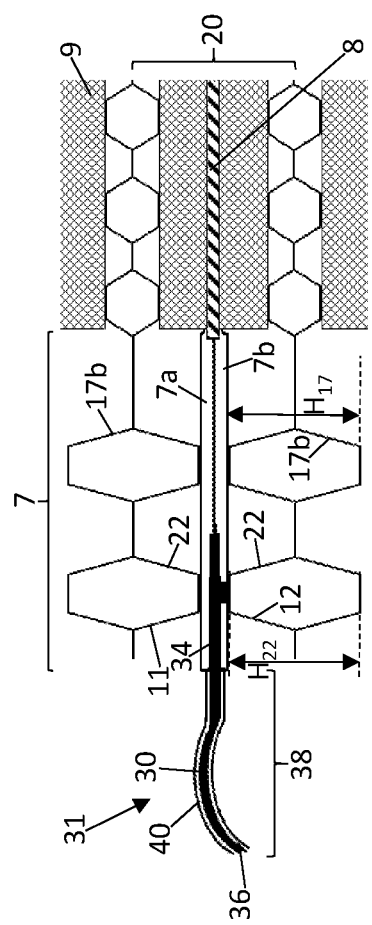
FIG. 6 shows a sectional illustration through an edge region of an electrochemical cell according to one embodiment of the present disclosure.

If the conductor 30 of the conductor 31 is constructed as a strand of copper wires for example, at least some of the wires may be passed through a cutout 23 in one of the reinforcing layers 7a, 7b and thus may be brought into electrical contact with an elevation 22 of an outer edge region 10b. This embodiment is shown in FIG. 6, in which part of the conductor 30 protrudes through the cutout 23 of the reinforcing layer 7b. It would also be possible to bring the entire end portion 34 into electrical contact with one of the separator plates through such a cutout.

In the embodiment of FIG. 5, the height $H_{22}$ of the elevation 22 is between 60 and 95% of the height $H_{17}$ of the sealing element 17b, in the present example 95%, while the height of the elevation 22 and of the sealing element 17b in the embodiment of FIG. 6 is equal. The heights are measured across both separator plates 11, 12 of a bipolar plate.

In the embodiment of FIG. 7, the first end portion 34 is arranged between the two reinforcing layers 7a, 7b and contacts the elevation 22 of the separator plate 12 in the region of a cutout 23 formed in the reinforcing layer 7b. The elevation 22 of the separator plate 7b may partially protrude through the cutout 23. The cutout 23 may be configured for example as a through-opening that has a shape corresponding to a cross-sectional shape of the elevation 22, for example circular. In this embodiment, the elevation 22 is between 8 and 25% higher than the sealing bead 17b; in the example shown, $H_{22}$ is 1.1 times $H_{17}$.

The embodiments shown in FIGS. 8 and 9 differ from the embodiments of FIGS. 5-7 in that two flexible electrical cables 31, 32 are provided between the separator plates 11, 12. In this embodiment, only second cells 20 of the stack 1a may be provided with flexible cables 31, 32.

In FIG. 8, a flexible electrical cable 31, 32 is provided on each side of the MEA 6. In this case, the first end portion 34 of the first flexible cable 31 is arranged between the reinforcing layer 7a and the elevation 22" of the first separator plate 11, while the first end portion 34 of the second flexible cable 32 is arranged between the reinforcing layer 7b and the elevation 22" of the second separator plate 12. The flexible cables 31, 32 are arranged on sides of the MEA 6 (or the combination of reinforcing layers 7a, 7b) that face away from one another.

The flexible cables 31, 32 of FIGS. 4-8 are separate components and are not constituent parts of the MEA 6.

In the embodiment of FIG. 9, however, the cable 31, 32 is a constituent part of the MEA 6. In the embodiment of FIG. 9, the MEA 6, such as the frame 7 of the MEA, has a projection 24 that projects laterally beyond the outer edge 10a of the separator plates 11, 12 and protrudes from the cell 20. The projection 24 is made of a flexible, electrically insulating material. The projection 24 may be formed by the material of at least one of the frame-like reinforcing layers, here both reinforcing layers 7a, 7b.

Figure 10:
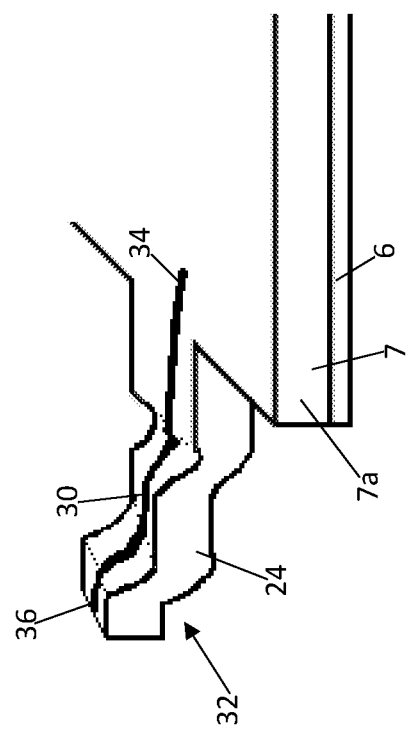
FIG. 10 shows part of a reinforcing layer of an MEA with an electrical cable, in an isometric illustration.
Figure 11D:
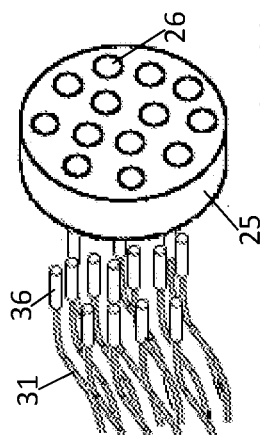
FIGS. 11A-11E show various configurations of electrical cables and interfaces connected thereto.
Figure 11E:
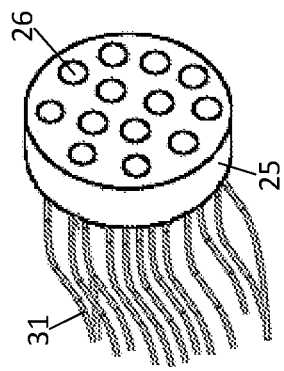
Figure 11A:
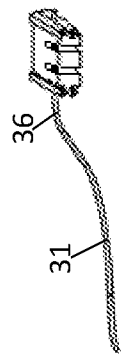
Figure 11B:
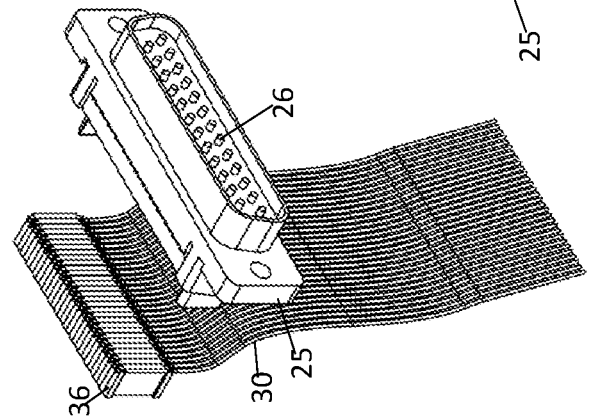
Figure 11C:
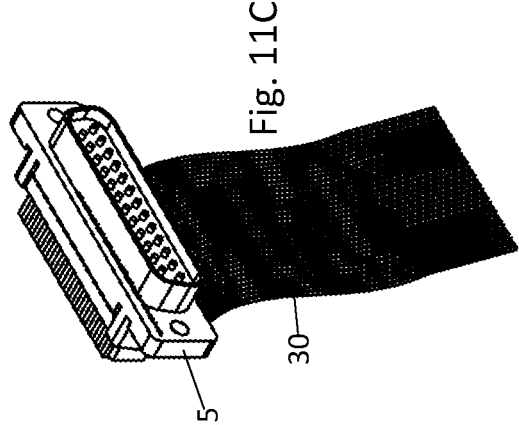

Flexible, conductive material is printed onto both sides of the projection 24 and forms the electrical conductors 30, 30' of the first and second cables 31, 32. As in the above embodiments, each cable 31, 32 comprises a first end portion 34, 34' and a second end portion 36, 36' protruding from the cell 20, wherein the first end portion 34, 34' electrically contacts the elevation 22". The projection 24 usually insulates the second end portions 36, 36' of the cables 31, 32 from one another. FIG. 10 shows an isometric illustration of part of the reinforcing layer 7a of FIG. 9. It can be seen that the flexible cable 32 is configured as a strip-shaped conductor track comprising a printed conductor 30.

In the embodiments of FIGS. 8 and 9, the height $H_{22}$ of the elevations 22' and 22 together is between 40 and 90% of the height $H_{17}$ of the sealing element 17b measured across the two separator plates 11, 12, in the examples shown close to 90%.

The cable 31, 32 may alternatively also be injected onto the reinforcing layer 7b, 7a of the MEA 6 and/or the projection 24 of the MEA 6 as a plastic element with electrically conductive particles embedded therein, for example graphite particles.

The flexible cables 31, 32 of FIGS. 4-8 are connected to the separator plates in such a way as to be able to be detached without being destroyed, and therefore in a non-irreversible manner, and also the cables 31, 32 of FIG. 5 are intended to be compressed with the separator plates 11, 12, that is to say are intended for connection by way of a force fit. In the embodiments of FIGS. 4-8, the MEA and/or the cable 31, 32 lies flat against the elevations of the separator plate. The material of the separator plates 11, 12 is not penetrated by material of the cables 31, 32.

An electrochemical system 1 according to the present disclosure comprises a plurality of stacked cells 20 of the type described above. In addition, the electrochemical system 1 may comprise a voltage measuring device (not shown), which measures the voltage of each individual cell 20 during operation of the electrochemical system 1. By virtue of the voltage measuring device, the voltages of the cells 20 can be monitored. The flexible cables 31, 32 electrically connect the voltage measuring device to the respective bipolar plate 10 or separator plate 11, 12. FIGS. 11A-11E show various possibilities for such an electrical connection. In some embodiments, the second end portion 36 of the cable 31, 32 is mechanically and electrically connected to an interface 25. The interface 25, which in FIGS. 11A-11E is configured as a female connector, can be electrically and mechanically connected via sockets 26 to a male connector of the voltage measuring device. Therefore, when the male connector is connected to the interface 25, the separator plate 12 and the voltage measuring device are electrically connected to one another so that the voltage of each cell 20 can be tapped off and measured during operation of the electrochemical system 1. Of course, the interface 25 may alternatively also be configured as a male connector and may be connected to a corresponding female connector of the voltage measuring device.

Figure 12:
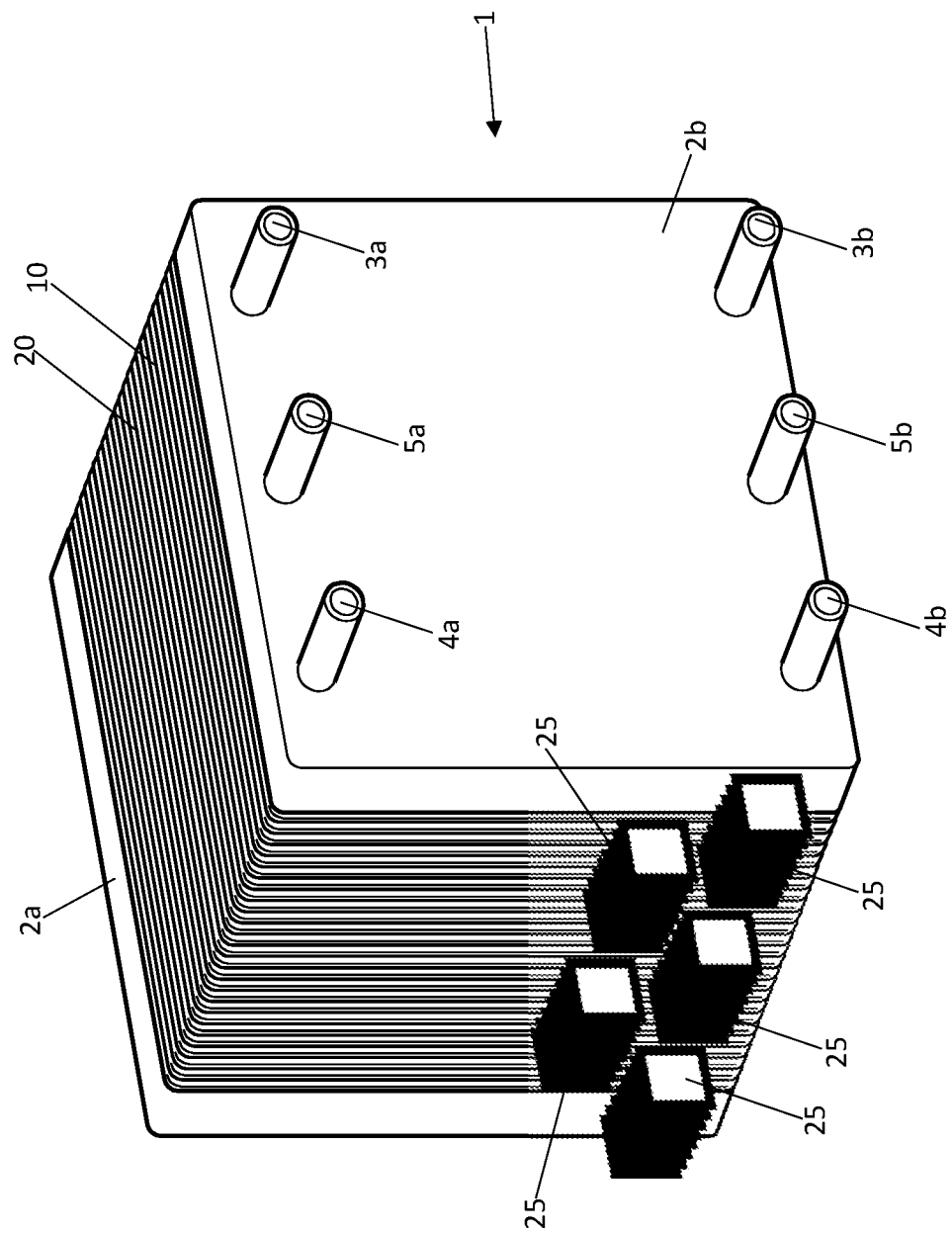
FIG. 12 shows an electrochemical system with inserted connectors according to one embodiment of the present disclosure, in a perspective view.

FIG. 12 shows an electrochemical system according to the present disclosure with five interfaces 25, here once again in the form of female connectors, which are each attached to precisely one separator plate so that the attachment is independent of a size of the stack. The attachment takes place in such a way that the actual female connectors are spaced apart from the outer edge of the separator plates, so that sufficient space is available to receive a plurality of flexible cables 31, 32, for example ten or sixteen. These are hidden in FIG. 12 since the female connector 25 has outer edges that are extended forwards to mechanically protect the cables 31, 32. The rest of the cable leading to the voltage measuring device has been omitted from the illustration for the sake of clarity.

FIGS. 1-12 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

It will be appreciated that the configurations and routines disclosed herein are exemplary in nature, and that these specific embodiments are not to be considered in a limiting sense, because numerous variations are possible. Moreover, unless explicitly stated to the contrary, the terms "first," "second," "third," and the like are not intended to denote any order, position, quantity, or importance, but rather are used merely as labels to distinguish one element from another. The subject matter of the present disclosure includes all novel and non-obvious combinations and sub-combinations of the various systems and configurations, and other features, functions, and/or properties disclosed herein.

As used herein, the term "approximately" is construed to mean plus or minus five percent of the range unless otherwise specified.

The following claims particularly point out certain combinations and sub-combinations regarded as novel and nonobvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

LIST OF REFERENCE SIGNS 1 electrochemical system
1a stack
1b stacking direction
2a end plate
2b end plate
3a media port
3b media port
4a media port
4b media port
5a media port
5b media port
6 membrane electrode assembly (MEA)
7 frame
7 frame-like reinforcing layer
7b frame-like reinforcing layer
8 membrane
9 gas diffusion layer
10 bipolar plate
10a outer edge
10b outer edge region
11 separator plate
12 separator plate
13 socket
15 through-opening
15' through-opening
16 through-opening
15a sealing bead
15a' sealing bead
16a sealing bead
17 flow field
17a guide structures
17b perimeter bead 18 distribution or collection region
18a distributing structures
19 connector
19a connector pin
19b cable
20 electrochemical cell
22 elevation
22' elevation
22" elevation
23 cutout
24 projection
25 interface
30 electrical conductor (without insulation)
30' electrical conductor (without insulation)
31 first electrical cable
32 second electrical cable
34 first end portion
34' first end portion
36 second end portion
38 insulated cable portion (insulation provided all the way round)
40 insulating layer
40' insulating layer
HA cell spacing
HB pin spacing
HA' cell spacing
HB' cable spacing

The invention claimed is:

1. A cell for an electrochemical system, comprising:
two separator plates each extending in a plate plane arranged parallel to one another;
a membrane electrode assembly (MEA) arranged parallel to and between the plate planes of the separator plates; and
at least one flexible electrical cable for tapping off an electrical voltage, the cable compressed between the separator plates and in contact with the MEA when assembled;
wherein the cable has a first end portion and a second end portion;
wherein the first end portion is arranged for fastening between the separator plates; and
wherein the second end portion protrudes laterally from the cell.

2. The cell according to claim 1, wherein at least one of the two separator plates has an elevation for fastening the cable, the elevation extending away from the plate plane towards the other separator plate, and the first end portion of the cable is arranged between a distal end of the elevation and the opposite separator plate.

3. The cell according to claim 1, wherein each of the two separator plates has an elevation, the two elevations extending away from a respective plate plane and facing towards one another, and the cable is arranged between a distal end of each of the elevations.

4. The cell according to claim 2, wherein the elevation is configured as a frustoconical embossment.

5. The cell according to claim 2, wherein the elevation is provided in an outer edge region of the separator plate.

6. The cell according to claim 1, wherein the MEA has at least one frame-like reinforcing layer, the first end portion of the cable positioned in contact with the reinforcing layer along a plane of the reinforcing layer.

7. The cell according to claim 6, wherein the MEA has two frame-like reinforcing layers arranged between the separator plates and extending along the plate planes of the separator plates, the first end portion being arranged between and parallel to the reinforcing layers of the MEA.

8. The cell according to claim 6, wherein the frame-like reinforcing layer has a cutout, and the first end portion electrically contacts the separator plate in a region of the cutout.

9. The cell according to claim 1, wherein the first end portion of the cable is arranged between and parallel to the MEA and one of the separator plates.

10. The cell according to claim 1, wherein the cable has an electrically insulating layer in some regions.

11. The cell according to claim 1, wherein the MEA has a projection that protrudes laterally from the cell, the projection forming part of the cable.

12. The cell according to claim 1, wherein the cable and the separator plates are made of different materials.

13. The cell according to claim 1, wherein the second end portion of the cable is configured for direct or indirect connection to a voltage measuring device for checking an electrical cell voltage.

14. The cell according to claim 1, wherein the separator plates, the MEA and the cable can be elastically compressed with one another.

15. The cell according to claim 1, wherein the second end portion is spaced apart from the separator plates by an insulated cable portion.

16. The cell according to claim 1, wherein the flexible cable is fastened between and/or to the separator plates by a force fit and/or a form fit and is detachable without being destroyed.

17. The cell according to claim 1, comprising two flexible electrical cables, the first end portions of the cables being arranged parallel to and between the separator plates, the MEA being arranged parallel to and between the first end portions of the cables, and the first end portions being electrically insulated from one another.

18. An electrochemical system, comprising a plurality of stacked cells, wherein at least one of the plurality of stacked cells is a cell according to claim 1.

19. The electrochemical system according to claim 18, wherein the second end portions of the cables are electrically and mechanically connected to an interface.

20. The electrochemical system according to claim 18, comprising a voltage measuring device for measuring an electrical cell voltage of the respective cells, each cable being directly or indirectly connected to the voltage measuring device by its second end portion.

* * * * *